United States Patent
Kang et al.

(10) Patent No.: US 11,267,434 B2
(45) Date of Patent: Mar. 8, 2022

(54) AIRBAG SUPPORT DEVICE AND CONTROL METHOD THEREOF

(71) Applicants: HYUNDAI MOTOR COMPANY, Seoul (KR); KIA MOTORS CORPORATION, Seoul (KR)

(72) Inventors: Seung Kyu Kang, Hwaseong-si (KR); Jong Hun Choi, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/026,846

(22) Filed: Sep. 21, 2020

(65) Prior Publication Data
US 2021/0402948 A1  Dec. 30, 2021

(30) Foreign Application Priority Data
Jun. 25, 2020 (KR) .................. 10-2020-0077986

(51) Int. Cl.
*B60R 21/2338* (2011.01)
*B60R 21/207* (2006.01)
*B60R 21/00* (2006.01)

(52) U.S. Cl.
CPC ........ *B60R 21/2338* (2013.01); *B60R 21/207* (2013.01); *B60R 2021/0032* (2013.01); *B60R 2021/23386* (2013.01)

(58) Field of Classification Search
CPC .............. B60R 21/2338; B60R 21/207; B60R 2021/0032; B60R 2021/23386
See application file for complete search history.

(56) References Cited

U.S. PATENT DOCUMENTS

| 11,027,683 | B1* | 6/2021 | Palazzolo | .............. B60N 2/015 |
| 2003/0107209 | A1* | 6/2003 | Haig | ....................... B60R 21/08 |
| | | | | 280/749 |
| 2003/0184061 | A1* | 10/2003 | Honda | .............. B60R 21/23138 |
| | | | | 280/730.2 |
| 2006/0119082 | A1* | 6/2006 | Peng | .................... B60R 21/2338 |
| | | | | 280/730.2 |

(Continued)

FOREIGN PATENT DOCUMENTS

| JP | 2013220714 A | * | 10/2013 |
| KR | 10-1720983 B1 | | 3/2017 |

*Primary Examiner* — Darlene P Condra
(74) *Attorney, Agent, or Firm* — Morgan, Lewis & Bockius LLP

(57) ABSTRACT

The present disclosure relates to an airbag, and discloses an airbag support device and a control method thereof. The airbag support device includes an airbag cushion embedded in a side surface of a seatback and configured to be inflated and deployed forward from the seatback; a pop-up tether having one end connected to the seatback, and configured to be deployed in a direction in which the airbag cushion is deployed and to penetrate the airbag cushion; and a pop-up tether module provided on a side surface of a seat cushion, having the other end of the pop-up tether connected to an end of a tether pole, and configured so that the pop-up tether between the seatback and the tether pole is pulled while the airbag cushion is deployed to support the airbag cushion by the pop-up tether in a portion penetrating the airbag cushion.

16 Claims, 9 Drawing Sheets

(56) References Cited

U.S. PATENT DOCUMENTS

| | | | |
|---|---|---|---|
| 2014/0015233 A1* | 1/2014 | Fukawatase | B60R 21/08 280/730.1 |
| 2014/0042733 A1* | 2/2014 | Fukawatase | B60R 21/0136 280/730.2 |
| 2014/0300088 A1* | 10/2014 | Fukawatase | B60R 21/08 280/729 |
| 2019/0217805 A1* | 7/2019 | Dry | B60N 2/14 |
| 2019/0275979 A1* | 9/2019 | Dry | B60R 21/2338 |
| 2019/0375361 A1* | 12/2019 | Markusic | B60R 21/055 |
| 2020/0148148 A1* | 5/2020 | Nakamura | B60R 21/232 |

* cited by examiner

AIRBAG SUPPORT DEVICE AND CONTROL METHOD THEREOF

CROSS REFERENCE TO RELATED APPLICATION

The present application claims priority of Korean Patent Application No. 10-2020-0077986 filed on Jun. 25, 2020, the entire contents of which is incorporated herein for all purposes by this reference.

TECHNICAL FIELD

The present disclosure relates to an airbag support device and a control method thereof, which support the side surface of an airbag while a pop-up tether is fixed to the front of the airbag to secure a side support force of the airbag.

BACKGROUND

In the case of a conventional seat, when a side collision of a vehicle occurs, a center bag may be supported by a center console of the vehicle to prevent a passenger from being separated.

However, since an autonomous vehicle has no a support such as a center console due to the application of a rotatable swivel seat, it is difficult to support a passenger.

In addition, since various passenger postures may occur, it is difficult to stably support the passenger even when the seating location and posture of the passenger are not an upright seating posture on the seat.

Accordingly, although an airbag system for constraining the passenger regardless of a collision direction is proposed, this also has a problem of limiting the constraint force of the passenger.

The foregoing explained as the background is intended merely to aid in the understanding of the background of the present disclosure, and is not intended to mean that the present disclosure falls within the purview of the related art that is already known to those skilled in the art.

SUMMARY OF THE DISCLOSURE

The present disclosure is intended to solve the above problem, and an object of the present disclosure is to provide an airbag support device and a control method thereof, which support a side surface of an airbag while a pop-up tether is fixed to the front of the airbag to secure a side support force of the airbag.

A configuration of the present disclosure includes: an airbag cushion embedded in the side surface of a seatback and configured to be inflated and deployed forward from the seatback; a pop-up tether having one end connected to the seatback, and configured to be deployed in a direction in which the airbag cushion is deployed and to penetrate the airbag cushion; and a pop-up tether module provided on a side surface of a seat cushion, having the other end of the pop-up tether connected to an end of a tether pole, and configured so that the pop-up tether between the seatback and the tether pole is pulled while the airbag cushion is deployed to support the airbag cushion by the pop-up tether in a portion penetrating the airbag cushion.

The end of the tether pole, which the other end of the pop-up tether is connected, may be an upper end of the tether pole, the upper end of the tether pole may be installed to be stretchable upward; and the pop-up tether may be configured to be pulled while the tether pole is stretched upward together with a deployment operation of the airbag cushion.

The pop-up tether module may include: a module body coupled to the side surface of the seat cushion, and having a pole hole formed on one side of an upper end of the module body; and the tether pole vertically provided inside the module body, provided to have an upper end exposed to the outside of the module body through the pole hole, and having a telescopic structure to have the upper end stretched upward.

The airbag support device may further include: an inflator configured to inject gas into the tether pole to stretch the tether pole, in which an edge of the upper end of the tether pole may have a closed shape while an interior of the tether pole is hollowed.

A vent hole may be provided in a side surface of an upper portion of the tether pole to discharge the gas injected into the tether pole.

A pole connecting ring may be provided in the upper end of the tether pole, a tether hole may be provided in the other side of the upper end of the module body, a body connecting ring may be provided inside the module body connected to the tether hole, so that the pop-up tether connected to the seatback passes through the pole connecting ring and then enters the tether hole to pass through the body connecting ring, and a pole fixing ring may be provided on the upper end of the tether pole, and the pop-up tether passing through the body connecting ring may exit from the tether hole to be fixed to the pole fixing ring.

The module body may include a first space in which the body connecting ring is disposed and a second space in which an inflator injecting gas into the tether pole is installed, and a partition wall may be disposed between the first space and the second space.

A portion of the pop-up tether located between the seatback and the seat cushion may be surrounded by a tube.

A through hole may be disposed in a middle end of the airbag cushion, so that the pop-up tether penetrates the through hole and thus the circumference of the through hole may be sewed and formed.

The airbag support device may include: a seat pressure sensor sensing a load of a passenger seated on a seat; a determination unit determining whether a seating posture of the passenger is a normal posture based on data detected by the seat pressure sensor; and a constraint control unit controlling so that the airbag is deployed while selectively deploying the pop-up tether according to the seating posture of the passenger, when a collision signal of a vehicle is detected.

The constraint control unit may control the pop-up tether and the airbag to be deployed, if the seating posture of the passenger is a normal posture, and control only the airbag to be deployed, if the seating posture of the passenger is an abnormal posture.

The determination unit may control to alert the abnormal seating posture of the passenger, if the seating posture of the passenger is the abnormal posture and the abnormal posture lasts for a predetermined time or more.

The airbag cushion and the pop-up tether may be installed on both sides of the seatback, and the pop-up tether modules may be installed on both sides of the seat cushion.

The present disclosure, as a method for controlling an airbag support device, includes: a posture determining step which determines, by a control unit, whether a seating posture of a passenger is a normal posture based on data detected by a seat pressure sensor, when a collision signal of a vehicle is generated, and a constraint control step which controls, by the control unit, to deploy an airbag while selectively deploying the pop-up tether according to the seating posture of the passenger.

The constraint control step may control the pop-up tether and the airbag to be deployed, if the seating posture of the passenger is a normal posture, and control only the airbag to be deployed, if the seating posture of the passenger is an abnormal posture.

The posture determining step may alert the abnormal seating posture of the passenger, if the seating posture of the passenger is the abnormal posture and the abnormal posture lasts for a predetermined time or more.

Through the above configurations, the present disclosure penetrates the airbag cushion in the state where the pop-up tether connected between the fixing point of the upper end of the tether pole and the seatback is tightened, so that the point where the pop-up tether penetrates the airbag cushion becomes the support point of the airbag cushion by the pop-up tether.

Accordingly, by reliably increasing the lateral constraint force of the airbag cushion, it is possible to prevent the passenger seated on the seat from being separated to the side of the seat even in the vehicle using the swivel seat including the conventional vehicle seat, thereby safely protecting the passenger, and improving field safety and merchantability.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Preferred exemplary embodiments of the present disclosure will be described in detail with reference to the accompanying drawings as follows.

Figure 1:
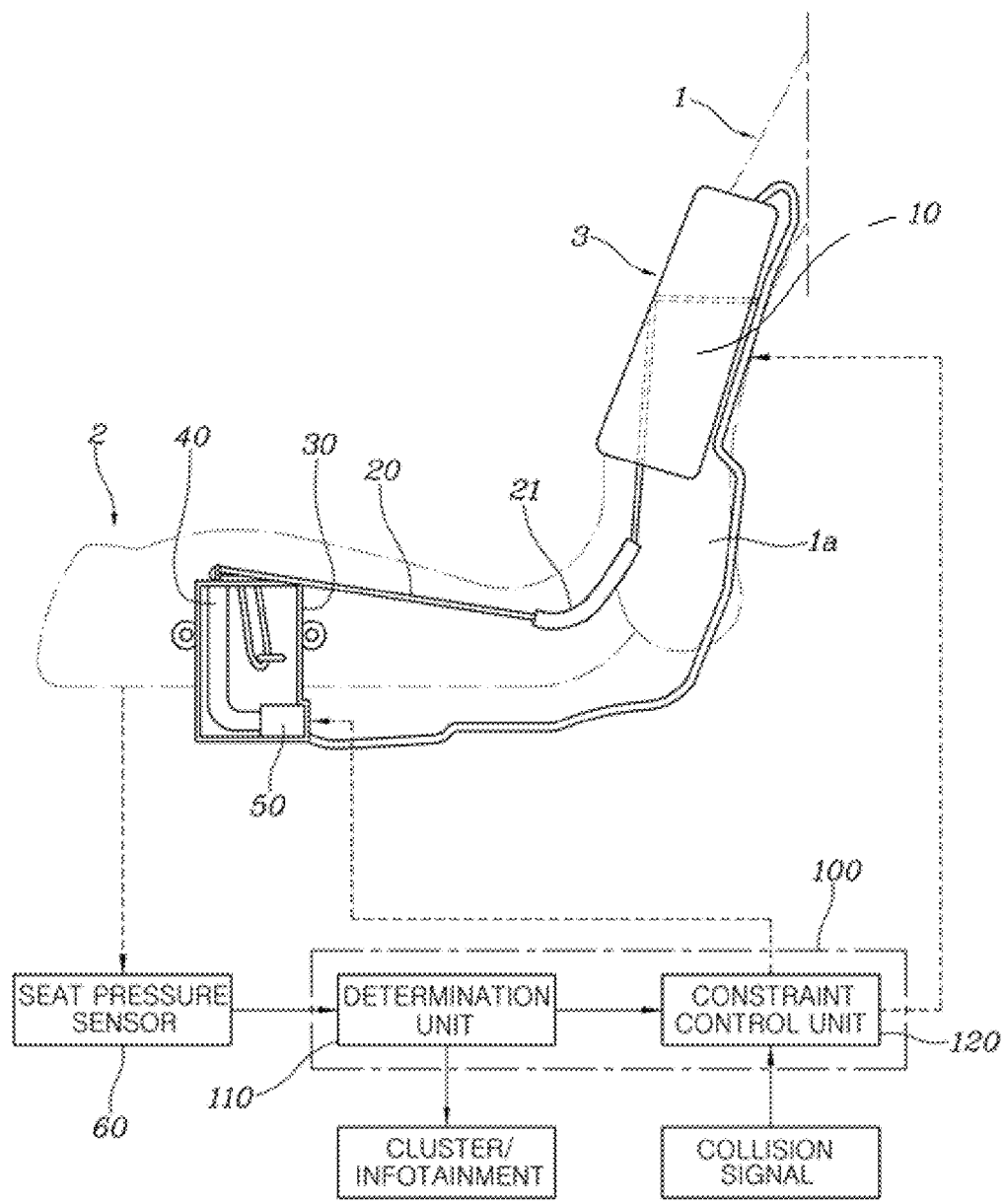
FIG. 1 is a diagram for explaining a coupling relationship in which an airbag support device according to the present disclosure is installed on a seat.
Figure 2:
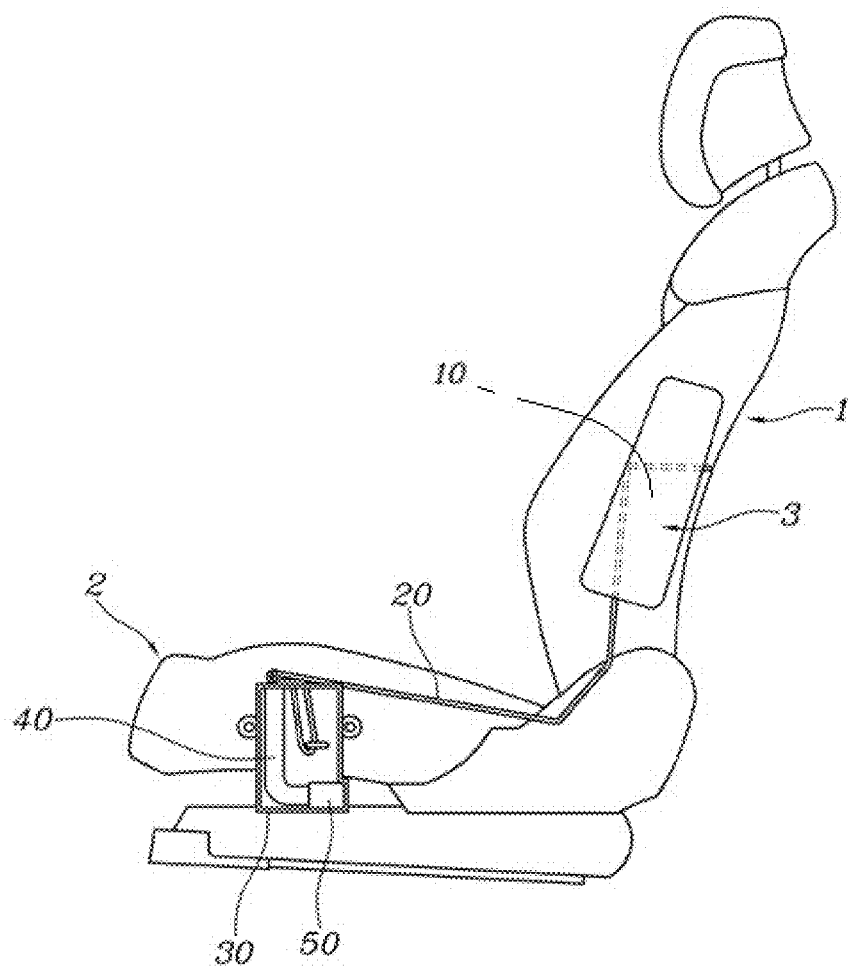
FIG. 2 is a diagram illustrating a state where the airbag support device according to the present disclosure is installed on the seat.

FIG. 1 is a diagram for explaining a coupling relationship in which an airbag support device according to the present disclosure is installed on a seat, and FIG. 2 is a diagram illustrating a state where the airbag support device according to the present disclosure is installed on the seat.

Referring to FIGS. 1 and 2, an airbag support device according to the present disclosure includes an airbag cushion 10 embedded in the side surface of a seatback 1 and expanded and deployed forward from the seatback 1; a pop-up tether 20 having one end connected to the seatback 1 and deployed in a direction in which the airbag cushion 10 is deployed while penetrating the airbag cushion 10; and a pop-up tether module provided on the side surface of a seat cushion 2, having the other end of the pop-up tether 20 connected to the end of a tether pole 40, and configured so that the pop-up tether 20 between the seatback 1 and the tether pole 40 is tightly pulled while the airbag cushion 10 is deployed to support the airbag cushion 10 by the pop-up tether 20 in a portion penetrating the airbag cushion 10.

More specifically, the airbag may be a side airbag embedded in the side surface of the seatback 1, and an airbag module 3 including an airbag inflator injecting gas into the airbag cushion 10 or the like together with the airbag cushion 10 may be mounted on both side surfaces of the seatback 1.

Accordingly, when the airbag is deployed by collision of a vehicle, gas is injected into the airbag cushion 10 through the airbag inflator and the side airbag is deployed toward the front of the seat from both sides of the seatback 1.

In addition, the rear end of the pop-up tether 20 may be fixed to a seatback frame 1a, and the middle end thereof is provided to penetrate the middle portion of the airbag cushion 10.

For example, the airbag cushion 10 is folded and embedded in the airbag module 3 in a state where the pop-up tether 20 penetrates the airbag cushion 10, so that the pop-up tether 20 is deployed together in the state of penetrating the airbag cushion 10 when the airbag cushion 10 is deployed.

Particularly, the other end of the pop-up tether 20 is connected to the upper end of the tether pole 40, the upper end of the tether pole 40 is installed to be stretchable upward, and the pop-up tether 20 is tightly pulled while the tether pole 40 is stretched upward together with the deployment operation of the airbag cushion 10.

That is, the pop-up tether module is installed on the front of the side surface of the seat cushion 2, the tether pole 40 is installed inside the pop-up tether module and thus the upper end of the pop-up tether 20 is stretched upward, and the pop-up tether 20 is fixed to the upper end of the tether pole 40, so that a fixing point P1 (shown in FIG. 7) of the pop-up tether 20 is formed at a front location in a direction in which the airbag cushion 10 is deployed.

Accordingly, the tension is formed as the pop-up tether 20 connected between the fixing point P1 and the seatback 1 is tightened, and the pop-up tether 20 tightened in this state is deployed in the state of penetrating the airbag cushion 10.

Accordingly, the point through which the pop-up tether 20 penetrates the airbag cushion 10 becomes a support point P2 (shown in FIG. 7) of the airbag cushion 10 by the pop-up tether 20 to allow the pop-up tether 20 to support the airbag cushion 10, thereby securing the side support force of the airbag cushion 10, and thus preventing the passenger from being separated to the side of the seat to safely protect the passenger.

In addition, the airbag cushion 10 and the pop-up tether 20 are installed on both sides of the seatback, and the pop-up tether modules are installed on both sides of the seat cushion 2 and thus the airbag support devices are installed on both sides of the seat, so that the passenger may be supported on both sides of the seat, thereby protecting the passenger more safely.

Figure 3:
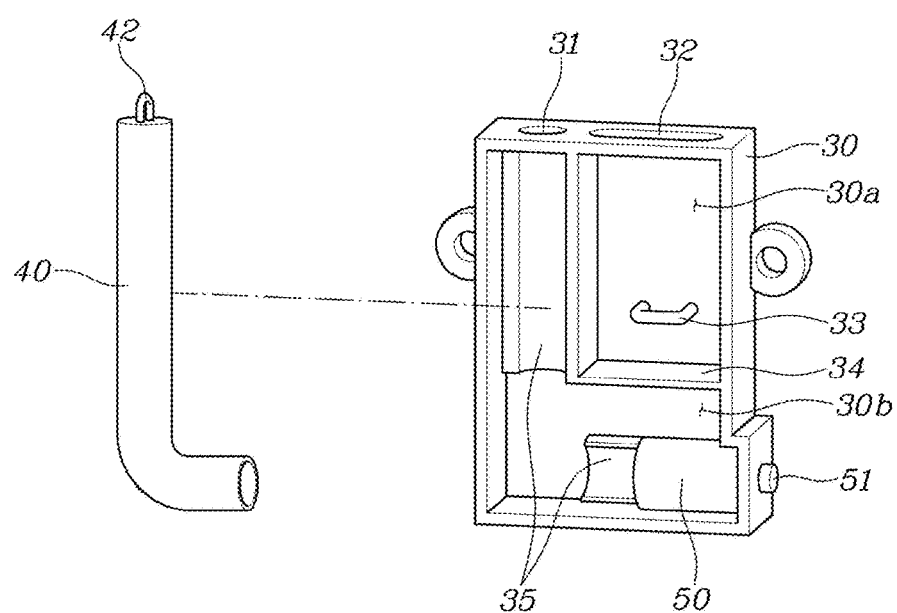
FIG. 3 is a diagram separately illustrating a shape before a tether pole and a module body according to the present disclosure are coupled.
Figure 4:
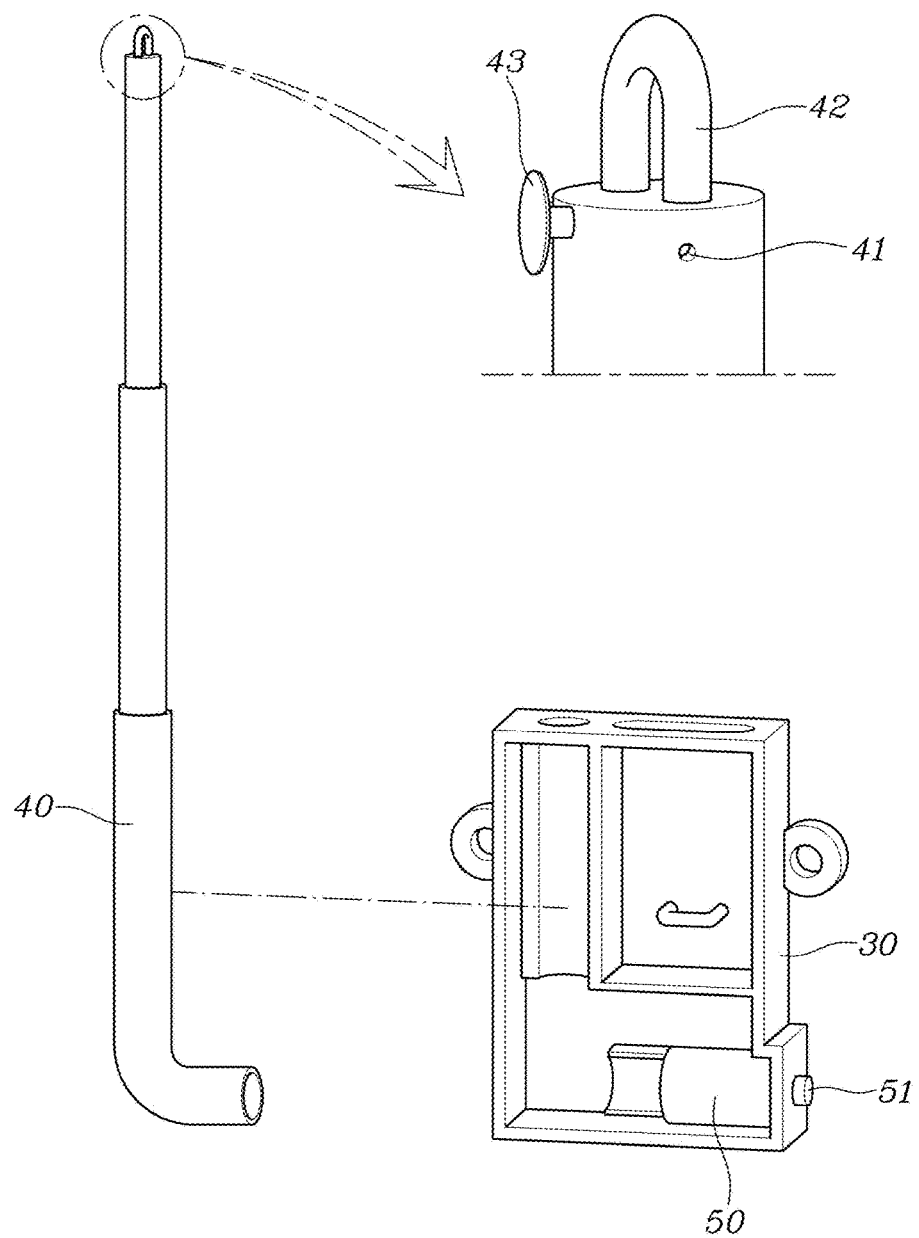
FIG. 4 is a diagram illustrating a state where the tether pole illustrated in FIG. 3 is operated to be stretched.
Figure 5:
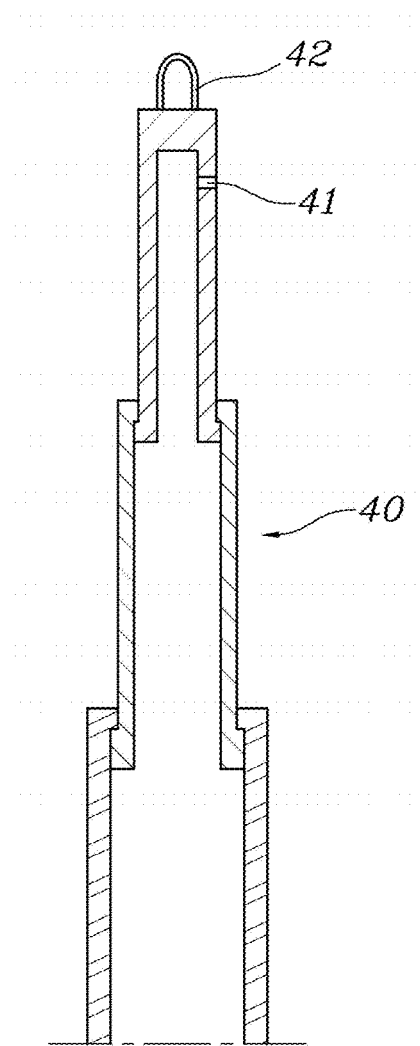
FIG. 5 is a cross-sectional diagram illustrating the state where the tether pole according to the present disclosure is operated to be stretched.

Meanwhile, FIG. 3 is a diagram separately illustrating the shape before the tether pole 40 and the module body 30 according to the present disclosure are coupled, FIG. 4 is a diagram illustrating a state where the tether pole 40 illustrated in FIG. 3 is operated to be stretched, and FIG. 5 is a cross-sectional diagram illustrating a state where the tether pole 40 according to the present disclosure is operated to be stretched.

Referring to FIGS. 3 to 5, the pop-up tether module according to the present disclosure includes the module body 30 and the tether pole 40.

The module body 30 is coupled to the side surface of the seat cushion 2, and a pole hole 31 is formed in one side of the upper end thereof.

The tether pole 40 is provided inside the module body 30 in the vertical and longitudinal directions, and has a structure which has the upper end provided to be exposed to the outside of the module body 30 through the pole hole 31, and is formed in a telescopic structure to have the upper end stretched upward. For reference, a pole guide 35 corresponding to a shape of the outer diameter of the tether pole 40 is formed inside the module body 30, so that the tether pole 40 is mounted in the pole guide 35.

That is, mounting brackets are provided on both sides of the module body 30, and the module body 30 is coupled to the side surface of the seat cushion 2 by the mounting bracket.

In addition, a circular pole hole 31 is formed on one side of the upper surface of the module body 30, so that the upper end of the tether pole 40 is provided to penetrate the pole hole 31.

Particularly, the tether pole 40 has a telescopic structure in which a plurality of cylindrical poles having different diameters are inserted concentrically, and the pole having a smaller diameter from the lower portion toward the upper portion is fitted therein based on the form in which the tether pole 40 is stretched.

In addition, an inner protrusion is formed on the inner circumferential surface of the upper end of the pole, and an outer protrusion is formed on the outer circumferential surface of the lower end of the pole, so that the inner protrusions and the outer protrusions of two poles adjacent to each other are locked in a process in which the respective poles are moved upward and stretched, thereby determining the maximum length at which the tether pole 40 is stretched.

In addition, an inflator 50 which injects gas into the tether pole 40 to stretch the tether pole 40 is further provided.

In addition, the tether pole 40 is formed in the shape in which the edge of the upper end of the tether pole 40 is closed while the interior of the tether pole 40 is hollowed.

For example, the inflator 50 is installed on the lower end inside the module body 30 in the horizontal and longitudinal directions, and one end of the inflator 50 is provided with a squib 51 while penetrating the module body 30, thereby igniting the inflator 50.

In addition, the lower end of the tether pole 40 is formed to be bent toward the other end of the inflator 50 to be connected to the other end of the inflator 50, and the gas injected from the inflator 50 is provided into the tether pole 40, so that the tether pole 40 is stretched.

That is, when gas is injected into the tether pole 40 through the inflator 50, the edge of the upper end of the tether pole 40 is pushed up by the pressure of the gas, so that the tether pole 40 may be stretched.

In addition, a vent hole 41 may be formed on the side surface of the upper portion of the tether pole 40 to discharge the gas injected into the tether pole 40. That is, a part of the gas filled into the tether pole 40 is discharged through the vent hole 41 in the process in which the upper end of the tether pole 40 is stretched by the pressure of the gas injected from the inflator 50, so that the gas pressure may be applied to the edge of the upper end of the tether pole 40 more reliably.

Figure 6:
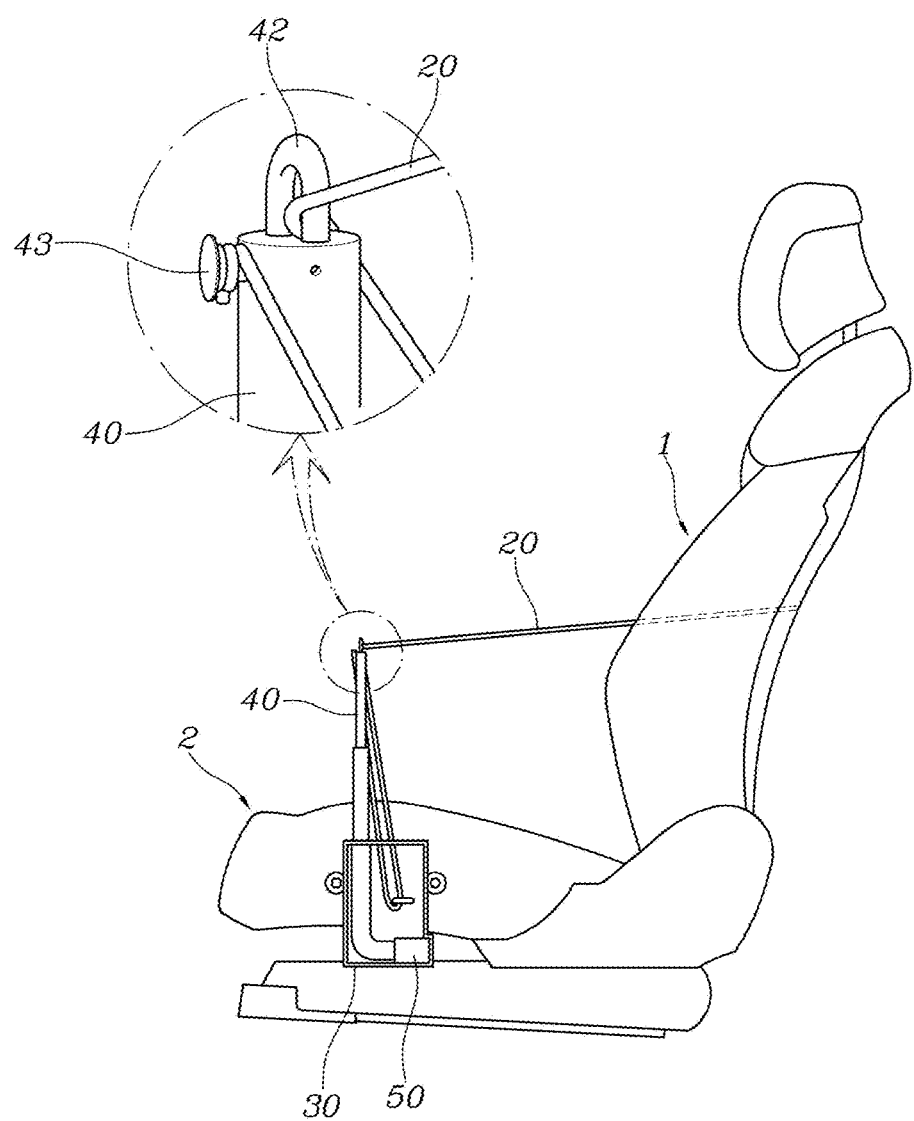
FIG. 6 is a diagram illustrating a state whether the airbag support device according to the present disclosure is operated.

Meanwhile, FIG. 6 is a diagram illustrating a state where the airbag support device according to the present disclosure is operated, in which the pop-up tether 20 is fixed to the tether pole 40 via the tether pole 40 and the module body 30, so that the pop-up tether 20 between the seatback 1 and the upper end of the tether pole 40 may be tightly formed in the operated and stretched state of the tether pole 40.

Referring to FIGS. 3 and 6, a pole connecting ring 42 having a hemispherical ring shape is formed on the upper end of the tether pole 40, and a tether hole 32 having a long oval shape is formed on the other side of the upper end of the module body 30, so that the tether hole 32 is in communication with the interior of the module body 30.

In addition, a body connecting ring 33 is formed inside the module body 30 connected to the tether hole 32, so that the pop-up tether 20 connected to the seatback 1 passes through the pole connecting ring 42 and then enters the tether hole 32 to pass through the body connecting ring 33.

In addition, a pole fixing ring 43 is formed on the side surface of the upper end of the tether pole 40, so that the pop-up tether 20 passing through the body connecting ring 33 exits from the tether hole 32 to be fixed to the pole fixing ring 43.

That is, when the tether pole 40 is operated to be stretched, the tether is pulled from the body connecting ring 33 and the tether is also pulled from the pole connecting ring 42 while the pop-up tether 20 fixed to the upper end of the tether pole 40 is pulled upward, so that the portion of the pop-up tether 20 between the pole connecting ring 42 and the seatback 1 is tightened, thereby forming tension.

Meanwhile, referring to FIG. 3, a first space 30a having the body connecting ring 33 formed inside the module body 30 and a second space 30b having the inflator 50 for injecting gas into the tether pole 40 installed are formed, and a partition wall 34 is formed between the first space 30a and the second space 30b.

For example, the first space 30a is formed on one side of the upper portion of the module body 30, and the body connecting ring 33 is formed in the first space 30a, and before the stretching operation of the tether pole 40, the portion of the pop-up tether 20 connected between the body connecting ring 33 and the tether pole 40 is located inside the first space 30a.

Accordingly, by blocking a space between the second space 30b and the first space 30a provided with the inflator 50 with the partition wall 34, the portion of the pop-up tether 20 located in the first space 30a is seated and stored on the upper surface of the partition wall 34, and in addition, heat transferred to the pop-up tether is blocked through the inflator 50 and the tether pole 40.

Subsequently, referring to FIG. 2, the portion of the pop-up tether 20 located between the seatback 1 and the seat cushion 2 has a structure of being surrounded by a tube 21.

That is, before the airbag cushion 10 is deployed, the pop-up tether 20 penetrates the airbag in a state mounted on the seatback 1, and is continued to the seat cushion 2 through the tube 21. At this time, a flag displaying the pop-up tether 20 is provided in the portion of the seatback 1 in which the pop-up tether 20 is embedded, so that the location of the pop-up tether 20 is displayed.

Figure 7:
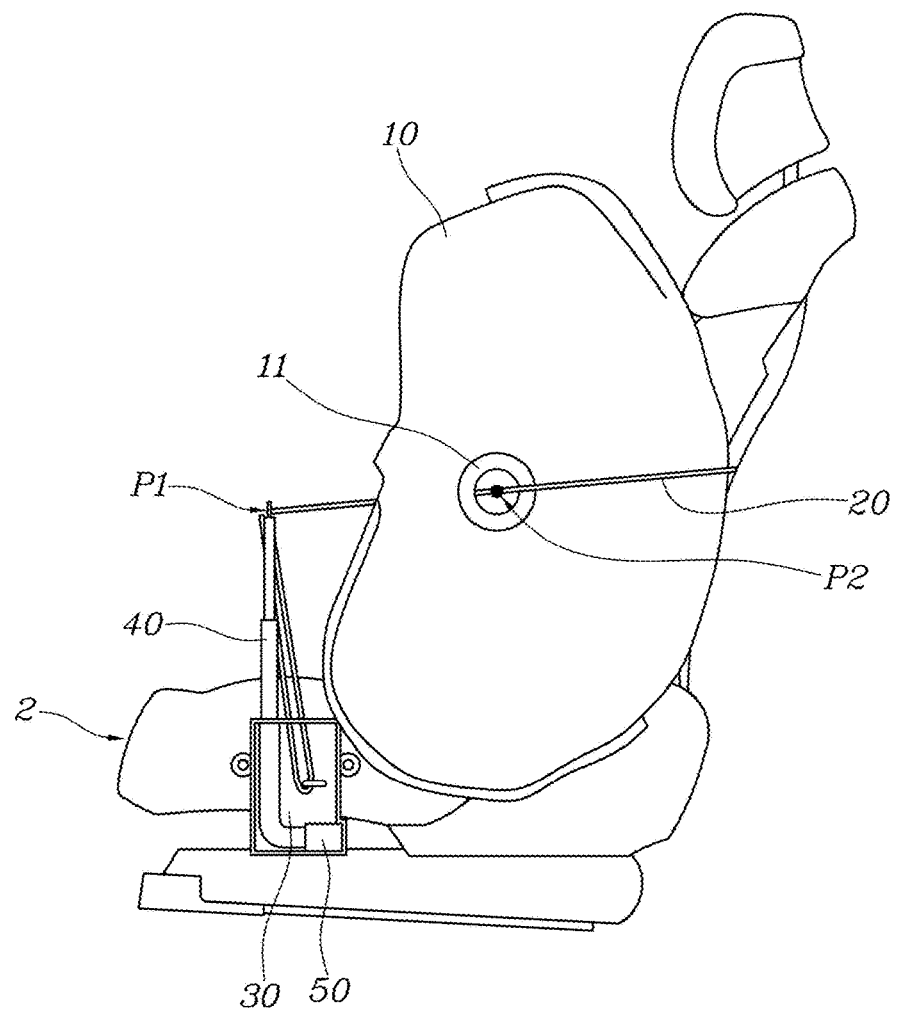
FIG. 7 is a diagram illustrating a state where an airbag is deployed together with the airbag support device according to the present disclosure.

FIG. 7 is a diagram illustrating a state where the airbag is deployed together with the airbag support device according to the present disclosure.

Referring to FIG. 7, a through hole 11 is formed in the middle end of the airbag cushion 10, so that the pop-up tether 20 penetrates the trough hole 11, and the circumference of the through hole 11 has a structure of being formed to be sewed.

For example, the through hole 11 is formed in the middle end of the airbag cushion 10, so that the middle end of the pop-up tether 20 penetrates the through hole 11. At this time, the cross-sectional area of the through hole 11 is wider than the pop-up tether 20, and the circumference of the through hole 11 is sewed, thereby minimizing the interference between the pop-up tether 20 and the through hole 11 in the process in which the pop-up tether 20 and the airbag cushion 10 are deployed.

Meanwhile, the present disclosure determines the seating location, posture, and the like of the passenger seated on the seat to determine whether the pop-up tether 20 is deployed, if the deployment of the airbag is required.

Referring to FIGS. 1 and 2, a seat pressure sensor 60 is provided to detect the load of the passenger seated on the seat.

In addition, a determination unit 110 determines whether the seating posture of the passenger is a normal posture using data detected by the seat pressure sensor 60. Here, the determination unit 110 may be an electronic control unit (ECU) including a microprocessor or a processor.

Accordingly, a constraint control unit 120 controls the airbag to be deployed while selectively deploying the pop-up tether 20 according to the seating posture of the passenger when detecting a collision signal of the vehicle. Here, the constraint control unit 120 may be an airbag control unit (ACU).

Specifically, the constraint control unit 120 controls the pop-up tether 20 and the airbag to be deployed when the seating posture of the passenger is a normal posture.

On the other hand, if the seating posture of the passenger is an abnormal posture, the constraint control unit 120 controls only the airbag to be deployed.

For example, the seat pressure sensor 60 may be provided in the entire region of the seat cushion 2 where the passenger is seated, thereby detecting the load of the passenger seated on the seat.

Accordingly, when the load data detected by the seat pressure sensor 60 is collected, the load data is compared and analyzed with the mapped data through the determination unit 110 to determine whether the lower end of the passenger's thigh is in a normal location.

As the determination result indicating a normal seating situation in which pressure is generated in the lower end of the passenger's thigh including the passenger's hip portion, the airbag cushion 10 is deployed while the pop-up tether 10 is deployed as the tether pole 40 is stretched by igniting the inflator 50.

On the other hand, pressure is generated in the passenger's hip portion, but when pressure is not generated in the lower end of the passenger's thigh, it is determined as an abnormal posture in which the passenger's leg portion is out of the seat. In this case, when the pop-up tether 20 is deployed, there is a risk of injury to the passenger due to the deployment pressure of the pop-up tether 20, so that only the airbag cushion 10 is deployed without deploying the pop-up tether 20.

In addition, when the seating posture of the passenger is an abnormal posture and the abnormal posture lasts for a predetermined time or more, the determination unit 110 controls to alert the abnormal seating posture of the passenger.

For example, when the abnormal posture such as the passenger's leg portion out of the seat occurs for a long time, the determination unit 110 may generate a message in which the abnormal seating posture lowers the constraint force of the passenger in the event of an accident to alert the passenger through a cluster or/and an infotainment system.

Meanwhile, a method for controlling the airbag support device according to the present disclosure includes a posture determining step which determines, by a control unit 100, whether the seating posture of the passenger is a normal posture using the data detected by the seat pressure sensor 60 when a vehicle collision signal is generated; and constraint control step which controls, by the control unit 100, the airbag to be deployed while selectively deploying the pop-up tether 20 according to the seating posture of the passenger. In one example, the method for controlling the airbag support device according to the present disclosure includes a posture determining step which determines, by the control unit 100, whether the seating posture of the passenger is one of a first posture (e.g., a normal posture) and a second posture (e.g., an abnormal posture) using the data detected by the seat pressure sensor 60 when a vehicle collision signal is generated; and constraint control step which controls, by the control unit 100, the airbag to be deployed while selectively deploying the pop-up tether 20 according to the seating posture of the passenger.

Specifically, the constraint control step controls the pop-up tether 20 and the airbag to be deployed, if the seating posture of the passenger is a normal posture, and controls only the airbag to be deployed, if the seating posture of the passenger is an abnormal posture.

In addition, the posture determining step may alert the abnormal seating posture of the passenger, if the seating posture of the passenger is an abnormal posture and the abnormal posture lasts for a predetermined time or more.

For reference, the control unit 100 according to the exemplary embodiment of the present disclosure may be implemented by a non-volatile memory (not illustrated) configured to store data relating to an algorithm configured to control the operations of various components of the vehicle or software instructions reproducing the algorithm and a processor (not illustrated) configured to perform the operation described below using data stored in the corresponding memory. Here, the memory and the processor may be implemented as separate chips. Alternatively, the memory and the processor may be implemented as a single chip integrated with each other. The processor may have the form of one or more processors.

Figure 9:
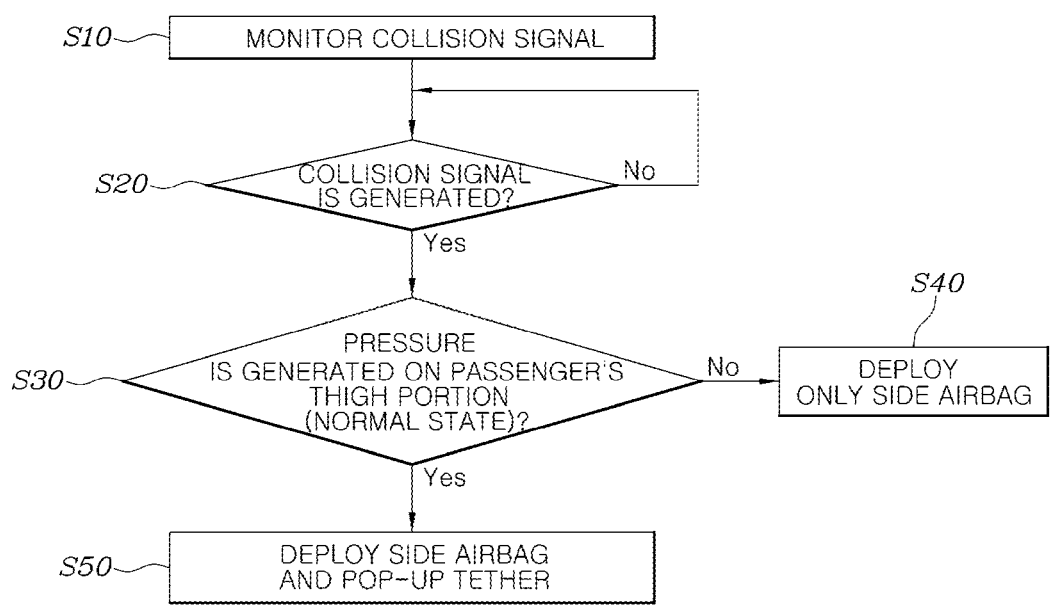
FIG. 9 is a flowchart illustrating a control process of the airbag support device according to the present disclosure.

FIG. 9 is a flowchart illustrating a control process of an airbag supporting device according to the present disclosure.

Describing the flow of the control process with reference to FIG. 9, a signal for sensing collision during operation of the vehicle is monitored (S10).

In the monitoring process, when the signal for sensing the collision is generated (S20), it is determined whether the passenger's thigh portion is located in a normal seating posture based on the load detected by the seat pressure sensor (S30).

As the determination result in the S30, if it is determined that the passenger's posture is an abnormal seating posture, the inflator 50 is not ignited, and the airbag inflator is ignited to deploy only the airbag (S40).

On the other hand, as the determination result in the S30, if it is determined that the passenger's posture is a normal seating posture, the inflator 50 is ignited to deploy the pop-up tether 20 and in addition, the airbag inflator is ignited to deploy the airbag (S50).

That is, when the gas is injected into the tether pole 40 through the inflator 50 in the state illustrated in FIG. 2, the edge of the upper end of the tether pole 40 is pushed up by the gas pressure, so that the tether pole 40 is operated to be stretched upward as illustrated in FIG. 6.

At this time, by fixing the pop-up tether 20 to the upper end of the tether pole 40, the fixing point P1 of the pop-up tether 20 is formed at the front location in the direction in which the airbag cushion 10 is deployed.

In addition, in the stretching operation process of the tether pole 40, the pop-up tether 20 fixed to the upper end of the tether pole 40 is pulled upward, so that the tether is pulled from the body connecting ring 33 and the pole connecting ring 42, and thus the portion of the pop-up tether 20 between the pole connecting ring 42 and the seatback 1 is tightly pulled.

Particularly, as illustrated in FIG. 7, the airbag cushion 10 is deployed in the form of penetrating the portion of the pop-up tether 20 in the state where the pop-up tether 20 connected between the fixed point P1 and the seat back 1 is tightened.

Accordingly, the point through which the pop-up tether 20 penetrates the airbag cushion 10 becomes the support point P2 of the airbag cushion 10 by the pop-up tether 20, so that the pop-up tether 20 supports the airbag cushion 10 on the side surface.

Accordingly, by reliably increasing the lateral constraint force of the airbag cushion 10, it is possible to prevent the passenger seated on the seat from being separated to the side of the seat to safely protect the passenger even in the vehicle using the swivel seat including the conventional vehicle seat, and thus improve field safety and merchantability.

Figure 8:
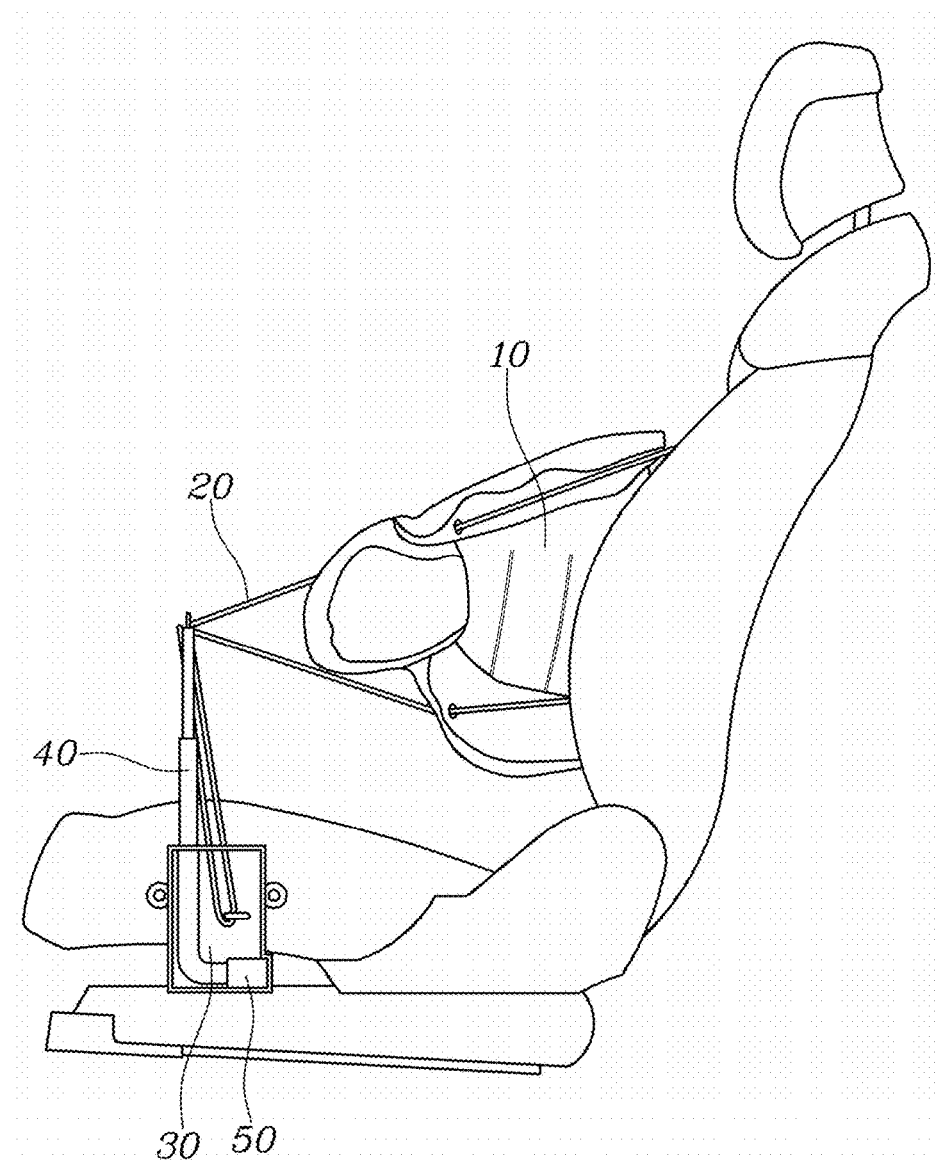
FIG. 8 is a diagram illustrating the form according to another exemplary embodiment in which a pop-up tether according to the present disclosure is connected.

That is, FIG. 8 is a diagram illustrating the form according to another exemplary embodiment in which the pop-up tether 20 according to the present disclosure is connected, in which the mounting points of the pop-up tether 20 connected to the seatback 1 may be two places at the upper end and the lower end or more, thereby further increasing the lateral constraint force of the airbag.

Meanwhile, while the present disclosure has been described above in detail only with respect to the specific examples, it is apparent to those skilled in the art that various modifications and changes are possible within the technical spirit scope of the present disclosure, and it is natural that such modifications and changes fall within the appended claims.

What is claimed is:

1. An airbag support device comprising:
   an airbag cushion embedded in a side surface of a seatback and configured to be inflated and deployed forward from the seatback;
   a pop-up tether having one end connected to the seatback, and configured to be deployed in a direction in which the airbag cushion is to be deployed and to penetrate the airbag cushion; and
   a pop-up tether module provided on a side surface of a seat cushion, having the other end of the pop-up tether connected to an end of a tether pole, and configured so that the pop-up tether between the seatback and the tether pole is pulled while the airbag cushion is deployed to support the airbag cushion by the pop-up tether in a portion penetrating the airbag cushion.

2. The airbag support device according to claim 1, wherein the end of the tether pole, which the other end of the pop-up tether is connected to, is an upper end of the tether pole,
   wherein the upper end of the tether pole is installed to be stretchable upward; and
   wherein the pop-up tether is configured to be pulled while the tether pole is stretched upward together with a deployment operation of the airbag cushion.

3. The airbag support device according to claim 1, wherein the pop-up tether module comprises:
   a module body coupled to the side surface of the seat cushion, and having a pole hole disposed on one side of an upper end of the module body; and
   the tether pole vertically provided inside the module body, provided to have the end exposed to the outside of the module body through the pole hole, and having a telescopic structure to have the end stretched upward,
   wherein the end of the tether pole, which the other end of the pop-up tether is connected to, is an upper end of the tether pole.

4. The airbag support device according to claim 3, further comprising: an inflator configured to inject gas into the tether pole to stretch the tether pole,
   wherein an edge of the upper end of the tether pole has a closed shape while an interior of the tether pole is hollowed.

5. The airbag support device according to claim 4, wherein a vent hole is provided in a side surface of an upper portion of the tether pole to discharge the gas injected into the tether pole.

6. The airbag support device according to claim 3, wherein a pole connecting ring is provided in the upper end of the tether pole,
   wherein the tether hole is disposed in the other side of the upper end of the module body,
   wherein a body connecting ring is provided inside the module body connected to the tether hole, so that the pop-up tether connected to the seatback passes through the pole connecting ring and then enters the tether hole to pass through the body connecting ring, and
   wherein a pole fixing ring is provided on the upper end of the tether pole, and the pop-up tether passing through the body connecting ring exits from the tether hole to be fixed to the pole fixing ring.

7. The airbag support device according to claim 6, wherein the module body includes a first space in which the body connecting ring is disposed and a second space in which an inflator injecting gas into the tether pole is installed, and
   wherein a partition wall is disposed between the first space and the second space.

8. The airbag support device according to claim 1, wherein a portion of the pop-up tether located between the seatback and the seat cushion is surrounded by a tube.

9. The airbag support device according to claim 1, wherein a through hole is disposed in a middle end of the airbag cushion, so that the pop-up tether penetrates the through hole.

10. The airbag support device according to claim 1, comprising:
    a seat pressure sensor sensing a load of a passenger seated on a seat;
    a determination unit determining whether a seating posture of the passenger is a normal posture based on data detected by the seat pressure sensor; and a constraint control unit controlling to deploy the airbag while selectively deploying the pop-up tether according to the seating posture of the passenger, when a collision signal of a vehicle is detected.

11. The airbag support device according to claim 10, wherein the constraint control unit controls the pop-up tether and the airbag to be deployed, if the seating posture of the passenger is a normal posture, and the constraint control unit controls only the airbag to be deployed, if the seating posture of the passenger is an abnormal posture.

12. The airbag support device according to claim 10, wherein the determination unit controls to alert an abnormal seating posture of the passenger, if the seating posture of the passenger is the abnormal posture and the abnormal posture lasts for a predetermined time or more.

13. The airbag support device according to claim 1, wherein the airbag cushion and the pop-up tether are installed on both sides of the seatback, and the pop-up tether module is installed on both sides of the seat cushion.

14. A control method of the airbag support device according to claim 1, the method comprising:

a posture determining step which determines, by a control unit, whether a seating posture of a passenger is a normal posture based on data detected by a seat pressure sensor, when a collision signal of a vehicle is generated, and a constraint control step which controls, by the control unit, to deploy an airbag while selectively deploying the pop-up tether according to the seating posture of the passenger.

15. The method according to claim 14, wherein the constraint control step controls the pop-up tether and the airbag to be deployed, if the seating posture of the passenger is a normal posture, and the constraint control step controls only the airbag to be deployed, if the seating posture of the passenger is an abnormal posture.

16. The method according to claim 14, wherein the posture determining step alerts an abnormal seating posture of the passenger, if the seating posture of the passenger is the abnormal posture and the abnormal posture lasts for a predetermined time or more.

* * * * *